(12) United States Patent
Adachi et al.

(10) Patent No.: US 7,406,255 B2
(45) Date of Patent: Jul. 29, 2008

(54) INFORMATION PROCESSING APPARATUS

(75) Inventors: Takafumi Adachi, Osaka (JP);
Hidetoshi Ishihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 932 days.

(21) Appl. No.: 10/868,194

(22) Filed: Jun. 16, 2004

(65) Prior Publication Data

US 2005/0028196 A1 Feb. 3, 2005

(30) Foreign Application Priority Data

Jun. 17, 2003 (JP) ............................ P2003-172110

(51) Int. Cl.
*H04N 5/91* (2006.01)
(52) U.S. Cl. ............................ 386/126; 386/82; 386/70; 386/96; 725/37; 725/39
(58) Field of Classification Search ................. 386/126, 386/96, 95, 82, 70; 725/37, 39
See application file for complete search history.

(56) References Cited

U.S. PATENT DOCUMENTS

| | | | | |
|---|---|---|---|---|
| 5,999,698 A | * | 12/1999 | Nakai et al. ................. | 386/125 |
| 6,385,388 B1 | * | 5/2002 | Lewis et al. .................... | 386/94 |
| 7,013,434 B2 | * | 3/2006 | Masters et al. ............... | 715/840 |
| 7,076,149 B1 | * | 7/2006 | Lewis et al. .................... | 386/46 |
| 2002/0174430 A1 | * | 11/2002 | Ellis et al. ....................... | 725/46 |
| 2003/0113096 A1 | * | 6/2003 | Taira et al. ...................... | 386/46 |
| 2005/0198667 A1 | * | 9/2005 | Lee ............................... | 725/47 |
| 2006/0236342 A1 | * | 10/2006 | Kunkel et al. .................. | 725/52 |

FOREIGN PATENT DOCUMENTS

JP 2002-269963 9/2002

* cited by examiner

*Primary Examiner*—Thai Tran
*Assistant Examiner*—Helen Shibru
(74) *Attorney, Agent, or Firm*—Morgan, Lewis & Bockius LLP

(57) ABSTRACT

A system controller displays all setup items on a setup screen, at the time of a setup mode in which a setup button 18a of a remote controller is depressed, in case that it is judged that a disc is not loaded on a tray of an apparatus itself, and, in case that it is judged that the disc is loaded, then, judges a type of the disc which is loaded, and on the basis of a result of that judgment, displays only a setup item which can be used for the loaded disc, and does not display a setup item which can not be used.

3 Claims, 8 Drawing Sheets

| ITEM | | SETUP FOR EACH DISC | | | | | MEANING OF SUB ITEM |
|---|---|---|---|---|---|---|---|
| MAIN ITEM | SUB ITEM | NO DISC | DVD | CD | VCD | SACD | |
| LANGUAGE | AUDIO | O | O | O | O | O | SOUND PRIORITY LANGUAGE |
| | SUBTITLE | O | O | — | O | — | CAPTION PRIORITY LANGUAGE |
| | DISC MENU | O | O | — | O | — | DISC MENU PRIORITY LANGUAGE |
| | PLAYER MENU | O | O | O | O | O | SCREEN DISPLAY PRIORITY LANGUAGE |
| DISPLAY | TV ASPECT | O | O | — | O | O | SET TV MOD (4:3 LETTER BOXP 4:3 PAN & SCAN, 16:9 WIDE 16:9 NORMAL) |
| | PANEL DISPLAY | O | O | O | O | O | SET BRIGHTNESS OF VFD |
| | ANGLE ICON | O | O | — | — | — | SET ANGLE ICON: ON/OFF |
| | AUTO POWER OFF | O | O | O | O | O | SET AUTO POWER: ON/OFF |
| | BACK GROUND | O | O | O | O | O | SET SCREEN MESSAGE: ON/OFF |
| AUDIO | DCR | O | O | — | — | — | SET DYNAMIC RANGE (MAXIMUM OFF COMPRESSED ON) |
| | DOLBY DIGITAL | O | O | — | O | — | SET DOLBY DIGITAL: ON/OFF |
| | DTS | O | O | O | — | O | SET DTS: ON/OFF |
| | DOWN SAMPLING | O | O | O | O | O | SET DOWN-SAMPLING CONVERSION OF PCM |
| | MPEG | O | O | O | O | O | SET MPEG AUDIO |
| AUDIO/ SACD | 2CH AREA | O | — | — | — | O | REPRODUCE 2ch AREA (DEFAULT) |
| | MULTI-AREA | O | — | — | — | O | REPRODUCE MULTI-ch AREA |
| | CD AREA | O | — | — | — | O | PLAY CD-LAYER |
| AUDIO/ SPEAKER | 2CH | O | O | O | — | O | DOWN-MIX 2ch (DEFAULT) |
| | 5.1CH | O | O | O | — | O | SHIFT TO SPEAKER SETTING MODE OUTPUTTED BY 5.1ch |
| PARENTAL | PARENTAL LEVEL | O | O | — | — | — | CHANGE PARENTALOCK LEVEL |
| | CHANGE | O | O | — | — | — | CHANGE PARENTALOCK PASSWORD |

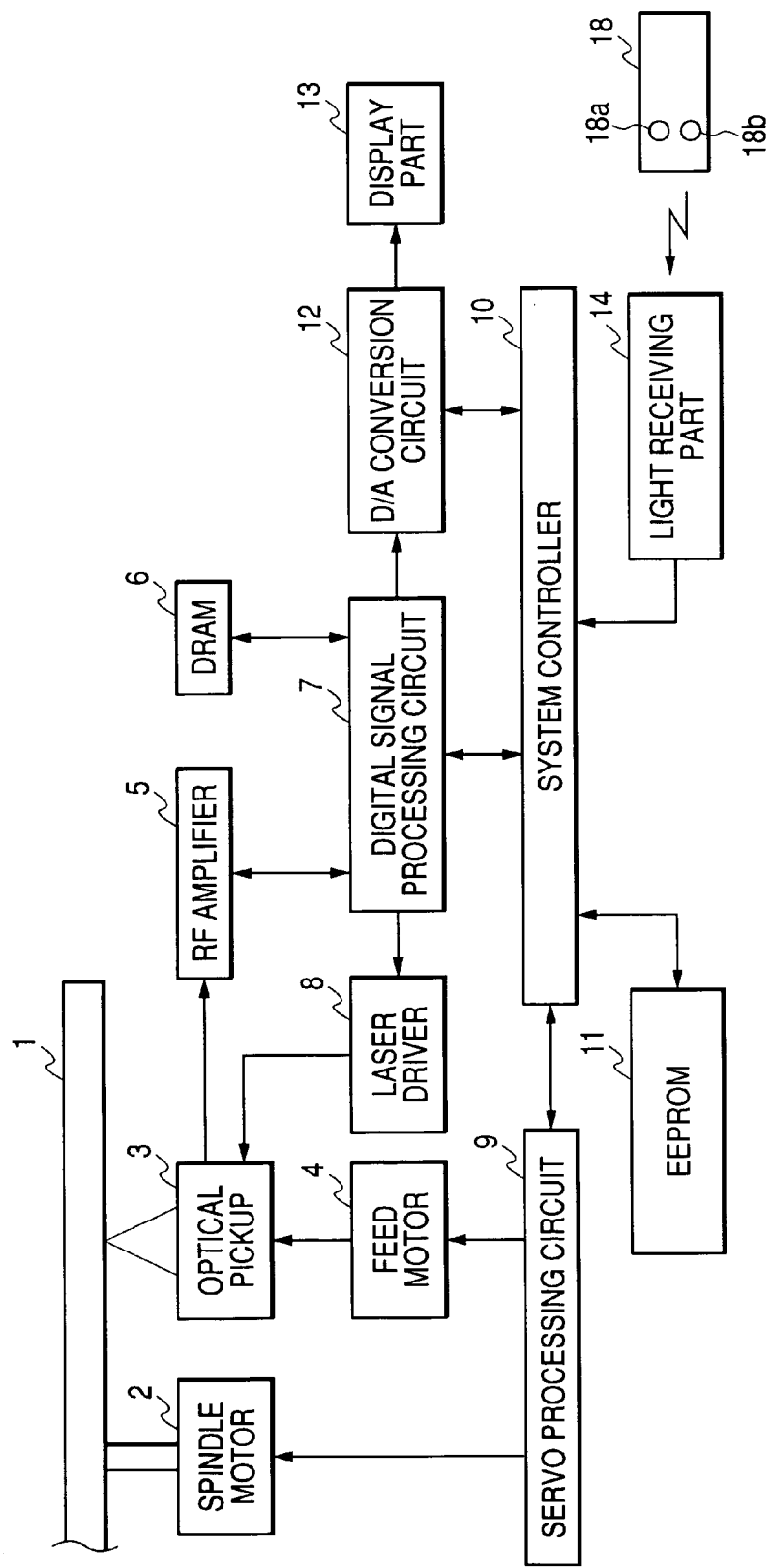

FIG. 2

| ITEM | | SETUP FOR EACH DISC | | | | | MEANING OF SUB ITEM |
|---|---|---|---|---|---|---|---|
| MAIN ITEM | SUB ITEM | NO DISC | DVD | CD | VCD | SACD | |
| LANGUAGE | AUDIO | O | O | O | O | O | SOUND PRIORITY LANGUAGE |
| | SUBTITLE | O | O | — | O | — | CAPTION PRIORITY LANGUAGE |
| | DISC MENU | O | O | — | O | — | DISC MENU PRIORITY LANGUAGE |
| | PLAYER MENU | O | O | O | O | O | SCREEN DISPLAY PRIORITY LANGUAGE |
| DISPLAY | TV ASPECT | O | O | — | O | O | SET TV MOD (4:3 LETTER BOXP 4:3 PAN & SCAN, 16:9 WIDE 16:9 NORMAL) |
| | PANEL DISPLAY | O | O | O | O | O | SET BRIGHTNESS OF VFD |
| | ANGLE ICON | O | O | — | — | — | SET ANGLE ICON: ON/OFF |
| | AUTO POWER OFF | O | O | O | O | O | SET AUTO POWER: ON/OFF |
| | BACK GROUND | O | O | O | O | O | SET SCREEN MESSAGE: ON/OFF |
| AUDIO | DCR | O | O | — | — | — | SET DYNAMIC RANGE (MAXIMUM OFF COMPRESSED ON) |
| | DOLBY DIGITAL | O | O | — | O | — | SET DOLBY DIGITAL: ON/OFF |
| | DTS | O | O | O | — | O | SET DTS: ON/OFF |
| | DOWN SAMPLING | O | O | O | O | O | SET DOWN-SAMPLING CONVERSION OF PCM |
| | MPEG | O | O | O | O | O | SET MPEG AUDIO |
| AUDIO/ SACD | 2CH AREA | O | — | — | — | O | REPRODUCE 2ch AREA (DEFAULT) |
| | MULTI-AREA | O | — | — | — | O | REPRODUCE MULTI-ch AREA |
| | CD AREA | O | — | — | — | O | PLAY CD-LAYER |
| AUDIO/ SPEAKER | 2CH | O | O | O | — | O | DOWN-MIX 2ch (DEFAULT) |
| | 5.1CH | O | O | O | — | O | SHIFT TO SPEAKER SETTING MODE OUTPUTTED BY 5.1ch |
| PARENTAL | PARENTAL LEVEL | O | O | — | — | — | CHANGE PARENTALOCK LEVEL |
| | CHANGE | O | O | — | — | — | CHANGE PARENTALOCK PASSWORD |

INFORMATION PROCESSING APPARATUS

BACKGROUND OF THE INVENTION

1. Field of the Invention

This invention relates to an information processing apparatus which is capable of reproducing various types of information media, and which is equipped with a setup button which carries out a basic setup of an apparatus itself in a stopped state of a reproducing operation, and which is configured so as to display a setup screen on a display part when the setup button is depressed in a stopped state of the apparatus. Here, the setup screen means mainly an initial setup screen of an apparatus itself at the time of factory shipment, but is a screen which can be set by a user, and is such a thing that, if a setup is carried out, it is reflected to all information media.

2. Description of the Related Art

In these days, provided are DVD players which are capable of reproducing various types of information media such as DVD (Digital Versatile Disc), CD (Compact Disc), VCD (video Compact Disc), SACD (Super Audio Compact Disc) (hereinafter, referred to as "disc").

In this case, when reproducible discs increase, it means that setup items on a setup screen increases, but in conventional DVD players, they are configured to display all setup items on the setup screens, regardless of status of players themselves. For example, even in case of CD in which a disc is loaded, displayed were a setup of a parental level and a language setup of a subtitle etc. which have nothing to do with reproduction of CD. On that account, they become things which are always complicated and hard to be used to users.

In this connection, as a thing which solves the suchlike complication, proposed is an information recording and reproducing apparatus which is configured in such a manner that, by depressing a mode button (MULTI-NAVIGATION button) of a remote controller, a type of a disc is judged at an apparatus side, and in accordance with a judgment result thereof, a function is selected, and displayed as a list, and thereby, a desired function can be selected from that list display screen (e.g., see, JP-A-2002-269963 publication).

FIG. 11 shows one example of the list display screen at this time.

This screen is a display screen example in case that a loaded disc is a Video CD, and function buttons which set up functions which corresponded to a type of a disc with respect to each disc, such as "PROGRAM PLAYBACK", "PICTURE RECORDING RESERVATION", "CONTINUOUS PLAYBACK", "RANDOM PLAYBACK", "PLAYBACK FROM TOP" which are realizable functions, and a setup button for carrying out an initial setup (basic setup) of an apparatus itself such as"INITIALSETUP" are displayed, and other buttons, e.g., "DISC MANAGEMENT", "PROGRAM NAVIGATION", "PLAY LIST NEW PREPARATION", "PLAY LIST" which are displayed in case of a DVD-RAM, are not displayed. By this, it becomes possible for users to set up various functions which corresponded to a type of a disc which is loaded, in accordance with a display screen, even it they do not recognize a type and a status of a disc, or functions which can be realized by them.

Function buttons which are displayed as a list in an apparatus which is described in the above-mentioned patent document 1 are basically functions which become void when a disc is replaced, i.e., functions which are set with respect to each disc, and as to a basic setup of an apparatus itself, which is set up regardless of a type of a disc; i.e., an initial setup, it is designed in such a manner that it can be set up by further depressing a button which is described as "INITIAL SETUP" in the list display screen shown in FIG. 11.

However, in the apparatus of the above-mentioned patent document 1, there is no reference to a display form of the setup screen which is displayed by depressing the "INITIAL SETUP" button, and therefore, as described above, on the setup screen, all setup items are to be displayed in the same manner as in the past. That is, even it a loaded disc is, for example, a CD, a setup of a parental level and a language setup of a subtitle etc., which have nothing to do with reproduction of CD, are to be displayed, and it becomes a thing which is still hard to be used to users.

SUMMARY OF THE INVENTION

It is an object of the invention to provide an information processing apparatus which is friendly to users, by changing a setup item to be displayed on a setup screen, in accordance with presence or absence of loading of a disc, and a type of a disc which is loaded.

An information processing apparatus of this invention is capable of reproducing various types of information media, and is equipped with a setup button which carries out a basic setup of an apparatus itself in a stopped state of an reproducing operation, and basic setup control means which carries out input control of the basic setup by displaying a setup screen on a display part when the setup button is depressed in a stopped state of the apparatus, information medium detecting means which detects whether an information medium is loaded in an apparatus main body or not, and type judging means which judges a type of the information medium loaded. And, the basic setup control means displays all setup items on the setup screen, at the time of the basic setup mode in which the setup button is depressed, in case that an information medium is not loaded in the apparatus main body as a detection result of the information medium detecting means, and displays a setup item which can be used for the information medium loaded, on the setup screen, on the basis of a judgment result of the type judging means, in case that an information medium is loaded.

In this case, the basic setup control means displays only a setup item which can be used for an information medium loaded, on the basis of a judgment result of the type judging means, on the setup screen, in case that an information medium is loaded, on the occasion of displaying the setup item, and does not display a setup item which can not be used.

Concretely speaking, in case that an information medium is not loaded, and in case that a loaded information medium is a DVD, all setup items of "LANGUAGE", "DISPLAY", "AUDIO", . . . "PARENTAL" are displayed on the setup screen, and in case that a loaded information medium is a CD, setup items of "LANGUAGE", "DISPLAY", "AUDIO" are displayed on the setup screen, and as to a setup item of "PARENTAL" which is not used for case of CD, it is made not to be displayed (to be non-displayed). By this, it becomes possible for a user to set up only items which are usable for CD.

Also, on the occasion of displaying the setup items, the basic setup control means displays a setup item which can be used for and a setup item which cannot be used for the information medium loaded, distinctively, on the setup screen, on the basis of a judgment result of the type judging means, in case that an information medium is loaded, and can make the setup item which can not be used, to fall in a setup impossible state.

Concretely speaking, in case that an information medium is not loaded, and in case that a loaded information medium is a DVD, all setup items of "LANGUAGE", "DISPLAY", "AUDIO", . . . "PARENTAL" are displayed on the setup screen, and in case that a loaded information medium is a CD, setup items of "LANGUAGE", "DISPLAY", "AUDIO" are displayed on the setup screen as setup possible items, and as to a setup item of "PARENTAL" which is not used for case of CD, it is displayed distinctively, as a setup impossible item. For example, the setup impossible item is distinguished by diluting a display color. By this, it becomes possible for a user to set up only items which can be used for a CD.

Also, an information processing apparatus of this invention is capable of reproducing various types of information media, and is equipped with a setup button which carries out a basic setup of an apparatus itself in a stopped state of an reproducing operation, and basic setup control means which carries out input control of the basic setup by displaying a setup screen on a display part when the setup button is depressed in a stopped state of the apparatus, information medium detecting means which detects whether an information medium is loaded in an apparatus main body or not, and type judging means which judges a type of the information medium loaded. And, the basic setup control means displays firstly a selection screen for selecting a select setup or a custom setup, on the display part, at the time of the basic setup mode in which the setup button is depressed, and in case that the custom setup is selected from this selection screen, displays all setup items on the setup screen, and in case that the select setup is selected from he selection screen and an information medium is not loaded in an apparatus main body as a detection result of the information medium detecting means, displays a setup item which is common to various types of information media on the setup screen, and in case that the select setup is selected from the selection screen and an information medium is loaded as a detection result of the information medium detecting means, displays a setup item which can be used for the information medium loaded on the basis of a judgment result of the type judging means.

That is, in this invention, it is configured in such a manner that, when the setup button is depressed, there occurs no immediate shift to the setup screen which corresponded to presence or absence of an information medium and a type of the information medium, but before that, the selection screen for selecting the select setup or the custom setup is displayed on the display part so that a user can select. By this, a user can firstly select to display all setup items on the setup screen by selecting the custom setup, or to display setup items which corresponded to a status of an information medium by selecting the select setup. After this, when a user selected the select setup, the above-described process is carried out for the first time.

In this case, when the select setup is selected, in case that an information medium is not loaded in an apparatus main body (in case of NO DISC), in the above-described process, all items are displayed, but this realized the same display as in case that a user selected the custom setup, and therefore, in this invention, it is configured to display a setup item which is common to each information medium, on the setup screen. By this, it is possible to provide a setup screen with a variety of display forms to users.

BRIEF DESCRIPTION OF THE DRAWINGS

These and other objects and advantages of this invention will become more fully apparent from the following detailed description taken with the accompanying drawings in which:

FIG. 1 is a system block diagram of a DVD apparatus which is an information processing apparatus of this invention;

FIG. 2 is an explanation view which shows a configuration example of setup item data at the time of setup, which is stored in EEPROM and can be used for various discs;

DESCRIPTION OF THE PREFERRED EMBODIMENTS

Figure 3:
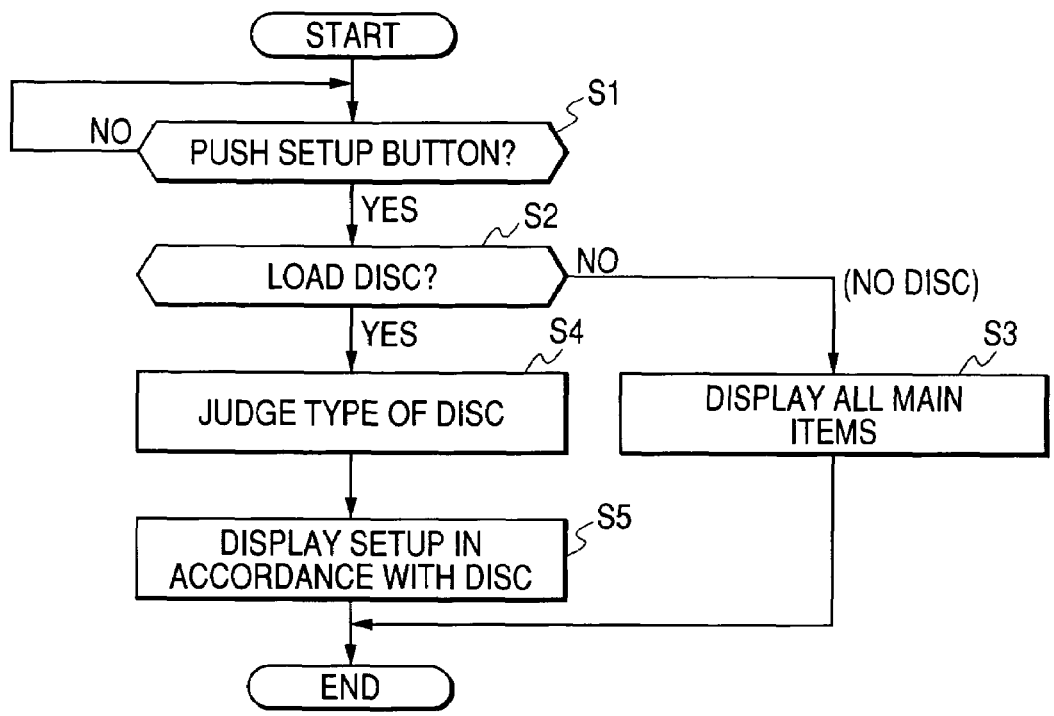
FIG. 3 is a flow chart which corresponded to embodiments 1 and 2, for explaining a display processing operation of a setup screen at the time of a setup mode (basic setup mode) for carrying out a basic setup of an apparatus itself.

Hereinafter, a mode for carrying out this invention will be described with reference to drawings.

FIG. 1 shows a system configuration of a DVD apparatus which is an information processing apparatus of this invention. This DVD apparatus may be of a playback only type, or may be of a recording and reproducing type, but in this embodiment, shown is a system configuration of the recording and reproducing type. Also, in this embodiment, it is assumed that this DVD apparatus is capable of reproducing 4 types of discs of DVD, CD, VCD, SACD, An output of an optical pickup 3 which writes data in a disc 1 which is loaded, and also reads data from the disc 1 is connected to a digital signal processing circuit 7 through a RE amplifier 5, and an output of the digital signal processing circuit 7 is connected to a laser driver 8 which controls a laser output at the time of writing and reading of data by the optical pickup 3. Also, an output of a servo processing circuit 9 is connected to a feed motor 4 for moving the optical pickup 3 in a radius direction of the disc 1, and a spindle motor 2 which drives to rotate the disc 1, and these digital signal processing circuit 7 and servo processing circuit 9 are connected to a system controller 10 which carries out operation control of an entire apparatus interactively.

To the digital signal processing circuit 7, interactively connected is a DRAM 6 as a buffer which stores data temporarily at the time of a recording operation and a reproducing operation, and connected is a D/A conversion circuit 12 which converts digital data into analog data and outputs to a display part 13 such as CRT.

To the system controller 10, interactively connected is an EEPROM 11 for storing specific information such as parameters of the disc 1 and a parameter of a laser power, and connected is a light receiving part 14 which receives an infrared ray signal from the remote controller 18. On the remote controller 18, disposed are a setup button 18a for carrying out a basic setup of an apparatus itself in a stopped state of a reproducing operation, and a mode button 18b which sets up a mode with respect to each disc 1 which is loaded in a state of a reproducing operation.

The digital signal processing circuit 7 carries out such processing etc. that it partitions off a signal of 16 bits every 8 bits, in accordance with an error correction system by use of EFM modulation, ACIRC (Advanced, Cross Interleaved Reed-Solomon Code), and converts that 8 bits into 14 bits. Also, the digital signal processing circuit 7 carries out processing of data compression etc. for writing digital data of image information etc. which is inputted from an external input terminal 16, in the disc 1.

The system controller 10 carries out such display control that it detects whether the disc 1 is loaded on a tray in the apparatus main body or not, at the time of a basic setup mode in which the setup button 18a of the remote controller 18 is depressed, in a stopped state of the apparatus, and in case that the disc 1 is not loaded on the tray, displays all setup items on the setup screen, and in case that the disc 1 is loaded, judges a type of that disc, and displays a setup item which can be used for the loaded disc 1 on the basis of a result of that judgement, on the setup screen. That is, basic setup control means, information medium detecting means and type judging means, which are described in claims, are realized by the system controller 10 in this embodiment.

Also, the system controller 10 does not shift immediately to the setup screen which corresponded to presence or absence of the disc 1 and a type of the disc 1 which is loaded, when the setup button 18a is depressed in a stopped state of the apparatus, but before that, displays a selection screen for selecting a select setup or a custom setup on the display part 13 so that a user can select. After this, when a user selected the select setup and the basic setup mode is realized, in case that the disc 1 is not loaded on a not-shown tray in the apparatus main body, it carries out such display control that it displays all setup items on the setup screen, and in case that the disc 1 is loaded, displays a setup item which can be used for the loaded disc 1 on the basis of a judgment result of the disc.

FIG. 2 shows a configuration example of setup item data at the time of setup, which is stored in EEPROM 11 and can be used for various discs (NO DISC, DVD, CD, VCD, SACD).

Setup items which can be used for each disc at the time of setup are divided into main items and sub items. The main items are composed of 6 items of "LANGUAGE", "DISPLAY", "AUDIO", "AUDIO/SACD", "AUDIO/SPEAKER", and "PARENTAL". Also, the sub items to these main items are as shown in the figure, an d for example, the sub items of "LANGUAGE" are composed of 4 items of "AUDIO", "SUBTITLE", "DISC MENU", and "PLAYER MENU". And, to each of these sub items, 0 (circle mark) is given to an item which can be used for each disc.

For example, with regard to each sub items of "LANGUAGE", "AUDIO", "SUBTITLE", "DISC MENU", and "PLAYER MENU", in case of NON DISC which is such a state that a disc is not loaded and in case that a loaded disc is a DVD or a VCD, all sub items become items which can be used, but in case that a loaded disc is a CD, only "AUDIO" and "PLAYER MENU" become items which can be used, and in case that a loaded disc is a SACD, only "AUDIO" becomes an item which can be used.

In addition, in FIG. 2, meaning of each sub item (setup content) is described in addition at a right side thereof, as reference.

Then, in a DVD apparatus with the above-described configuration, a display processing operation of the setup screen at the time of a setup mode (basic setup mode) for carrying out a basic setup of an apparatus itself will be described with respect to each embodiment.

Embodiment 1

Figure 4:
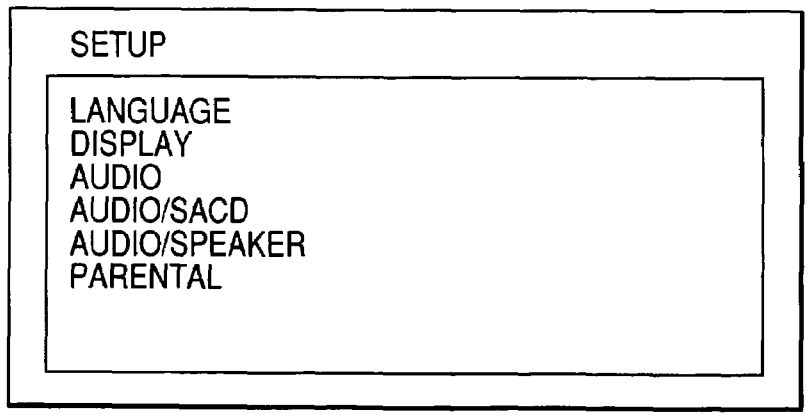
FIG. 4 is an explanation view of a setup screen which is displayed on a display part in accordance with an information medium.
Figure 5:
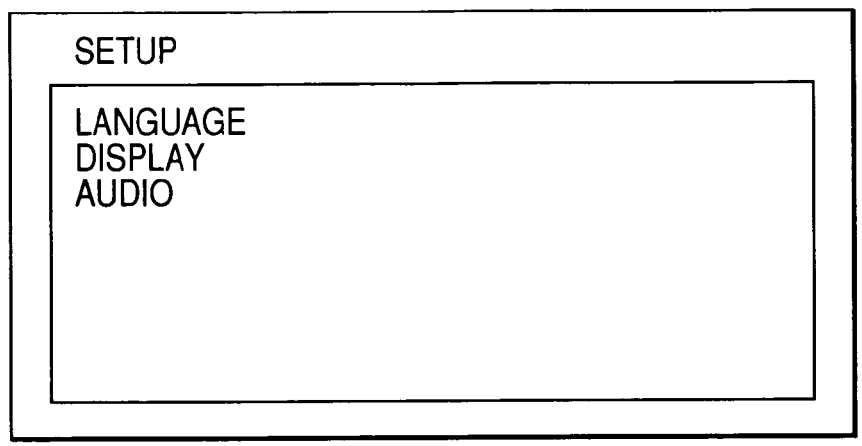
FIG. 5 is an explanation view of a setup screen which is displayed on a display part in accordance with an information medium.
Figure 6:
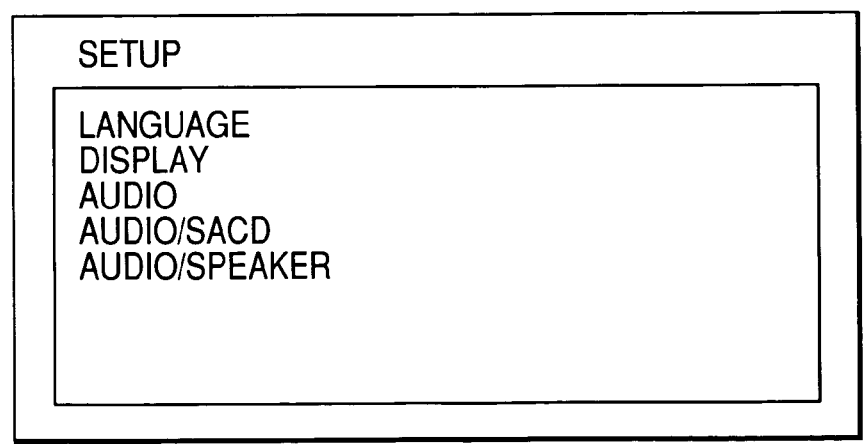
FIG. 6 is an explanation view of a setup which is displayed on a display part in accordance with an information medium.

This embodiment 1 will be described with reference to a flow chart which is shown in FIG. 3, and setup screen examples which are shown in FIGS. 4 through 6.

In a stopped state of a reproducing operation, when a user operates the setup button 18a of the remote controller 18 (step S1), this operation signal is received by the light receiving part 14, and given to the system controller 10.

The system controller 10, when it receives this operation signal, firstly confirms whether the disc 1 is loaded on a not-shown tray of the apparatus main body or not (step S2). As a confirmation method, for example, it is confirmed by irradiating light from the optical pickup 3, and by checking whether reflected light thereof can be received by the optical pickup 3 or not. In case that the disc 1 is not loaded on the tray, it is impossible to receive the reflected light, and therefore, in this case, it is judged that the disc 1 is not loaded on the tray. In this regard, however, without utilizing the optical pickup 3, detecting means, for detecting whether the disc 1 is loaded on the tray or not, may be disposed separately with regard to detecting means for detecting presence or absence of a disc, there are various proposals up to now, and therefore, the detailed explanation will be omitted here.

As a result of confirmation, in case that the disc 1 is not loaded on the tray (in case that it is judged to be NO in the step S2: i.e., in case of NO DISC), the system controller 10 extracts main items from setup item data shown in FIG. 2, which is stored in EEPROM 11, and displays them on the display part 13 as the setup screen (step S3).

FIG. 4 shows a display example of the setup at this time. On the setup, displayed are all main items of "LANGUAGE", "DISPLAY", "AUDIO", "AUDIO/SACD", "AUDIO/SPEAKER", and "PARENTAL".

When a user selects an item which he/she wishes to set up, out of these main items (concretely speaking, when a cursor is moved to an arbitrary main item and a not-shown determination button is pressed etc.), the system controller 10 extracts corresponding sub items from the setup item data shown in FIG. 2, and displays them on the setup screen. A user is to set up an item which he/she desires, out of sub items which were displayed. Since a concrete setup method is well-known in the past, the explanation will be omitted here.

Also, as a result of confirmation in the step S2, in case that the disc is loaded on the tray, the system controller 10 judges a type of the disc which is loaded (step S4). As a judging method, it is judged by reading disc information which is written in the disc by use of the optical pick up 3. For example, in case of CD, it is judged by reading TOC information.

And, on the basis of a result of that judgment, setup items which can be used for the loaded disc are displayed on the setup screen (step S5).

Concretely speaking, in case that the loaded disc is a DVD, in the same manner as the case of NO DISC, as shown in FIG. 4, all setup items of "LANGUAGE", "DISPLAY", "AUDIO", "AUDIO/SACD", "AUDIO/SPEAKER", and "PARENTAL" are displayed on the setup screen.

Also, in case that the loaded disc is a CD or a VCD, as shown in FIG. 5, setup items of "LANGUAGE", "DISPLAY", "AUDIO", "AUDIO/SACD", and "AUDIO/SPEAKER" are displayed on the setup screen. On this occasion, in this embodiment 1, setup items of "AUDIO/SACD", "AUDIO/SPEAKER", and "PARENTAL" are not displayed. That is, it is made to be non-displayed. By this, it becomes possible for a user to set up only an item which can be used for CD.

Also, in case that the loaded disc is a SACD, as shown in FIG. 6, setup items of "LANGUAGE", "DISPLAY", "AUDIO", "AUDIO/SACD", and "AUDIO/SPEAKER" are displayed on the setup screen. On this occasion, in this embodiment 1, the setup item of "PARENTAL", which is not used for SACD, is not displayed That is, it is made to be non-displayed. By this, it becomes possible for a user to set up only an item which can be used for SACD.

Embodiment 2

Figure 7:
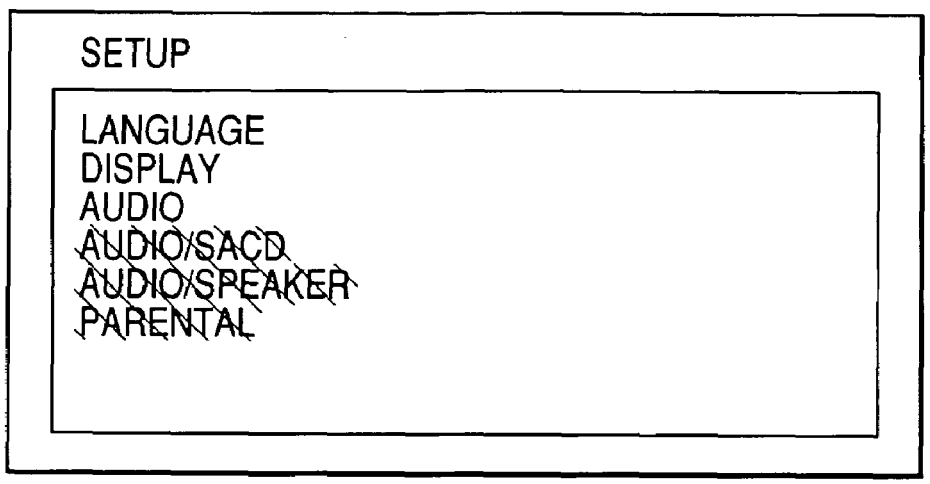
FIG. 7 is an explanation view of a setup which is displayed on a display part in accordance with an information medium.
Figure 8:
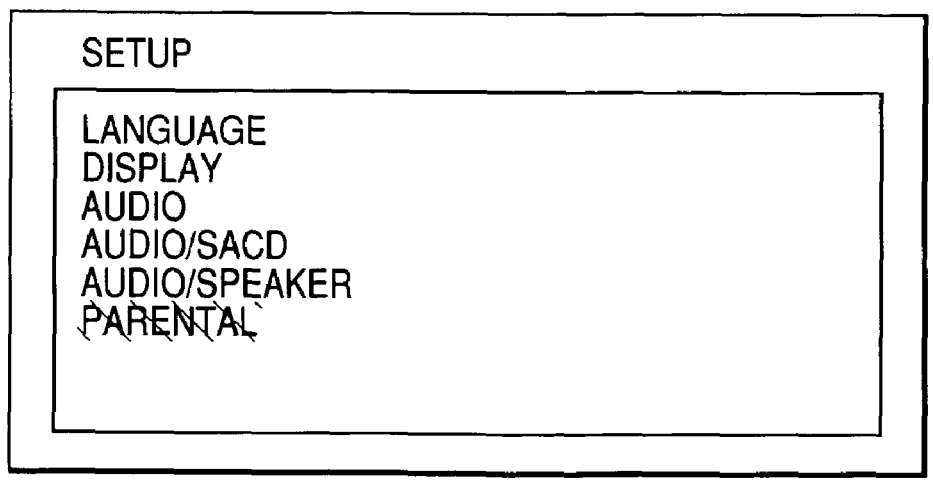
FIG. 8 is an explanation view of a setup which is displayed on a display part in accordance with an information medium.

This embodiment 2 will be described with reference to the flow chart which is shown in FIG. 3, and setup examples which are shown in FIGS. 7 and 8.

In a stopped state of a reproducing operation, when a user operates the setup button 18a of the remote controller 18 (step S1), this operation signal is received by the light receiving part 14, and given to the system controller 10.

The system controller 10, when it receives this operation signal, firstly confirms whether the disc 1 is loaded on a not-shown tray of the apparatus main body or not (step S2).

As a result of confirmation, in case that the disc 1 is not loaded on the tray (in case that it is judged to be NO in the step S2: i.e., in case of NO DISC), the system controller 10 extracts main items from setup item data shown in FIG. 2, which is stored in EEPROM 11, and displays them on the display part 13 as the setup as shown in FIG. 4 (step S3).

Also, as a result of confirmation in the step S2, in case that the disc is loaded on the tray, the system controller 10 judges a type of the disc which is loaded (step S4). And, on the basis of a result of that judgment, the setup screen, which corresponded to the loaded disc, is displayed (step S5). That is, a setup item which can be used for and a setup item which can not be used for the loaded disc are displayed distinctively on the setup screen, and the setup item which can not be used is made to fall in a setup impossible state.

Concretely speaking, in case that the loaded disc is a DVD, in the same manner as the case of NO DISC, as shown in FIG. 4, all setup items of "LANGUAGE", "DISPLAY", "AUDIO", "AUDIO/SACD", "AUDIO/SPEAKER", and "PARENTAL" are displayed on the setup screen.

Also, in case that the loaded disc is a CD or a VCD, as shown in FIG. 7, setup items of "LANGUAGE", "DISPLAY", "AUDIO" are displayed on the setup screen, and setup items of "AUDIO/SACD", "AUDIO/SPEAKER" and "PARENTAL", which are not used for CD, are displayed distinctively as setup impossible items. In this embodiment 2, the setup impossible item is distinguished by diluting a display color. In this regard, however, in FIG. 7, slant lines are given to the setup impossible items. By this, it becomes possible for a user to set up only an item which can be used for CD.

Also, in case that the loaded disc is a SACD, as shown in FIG. 8, setup items of "LANGUAGE", "DISPLAY", "AUDIO", "AUDIO/SACD", and "AUDIO/SPEAKER" are displayed on the setup screen, and the setup item of "PARENTAL", which is not used for SACD, is displayed distinctively as the setup impossible item. In this regard, however, in FIG. 8, slant lines are give to the setup impossible item. By this, it becomes possible for a user to set up only an item which can be used for SACD.

Embodiment 3

Figure 9:
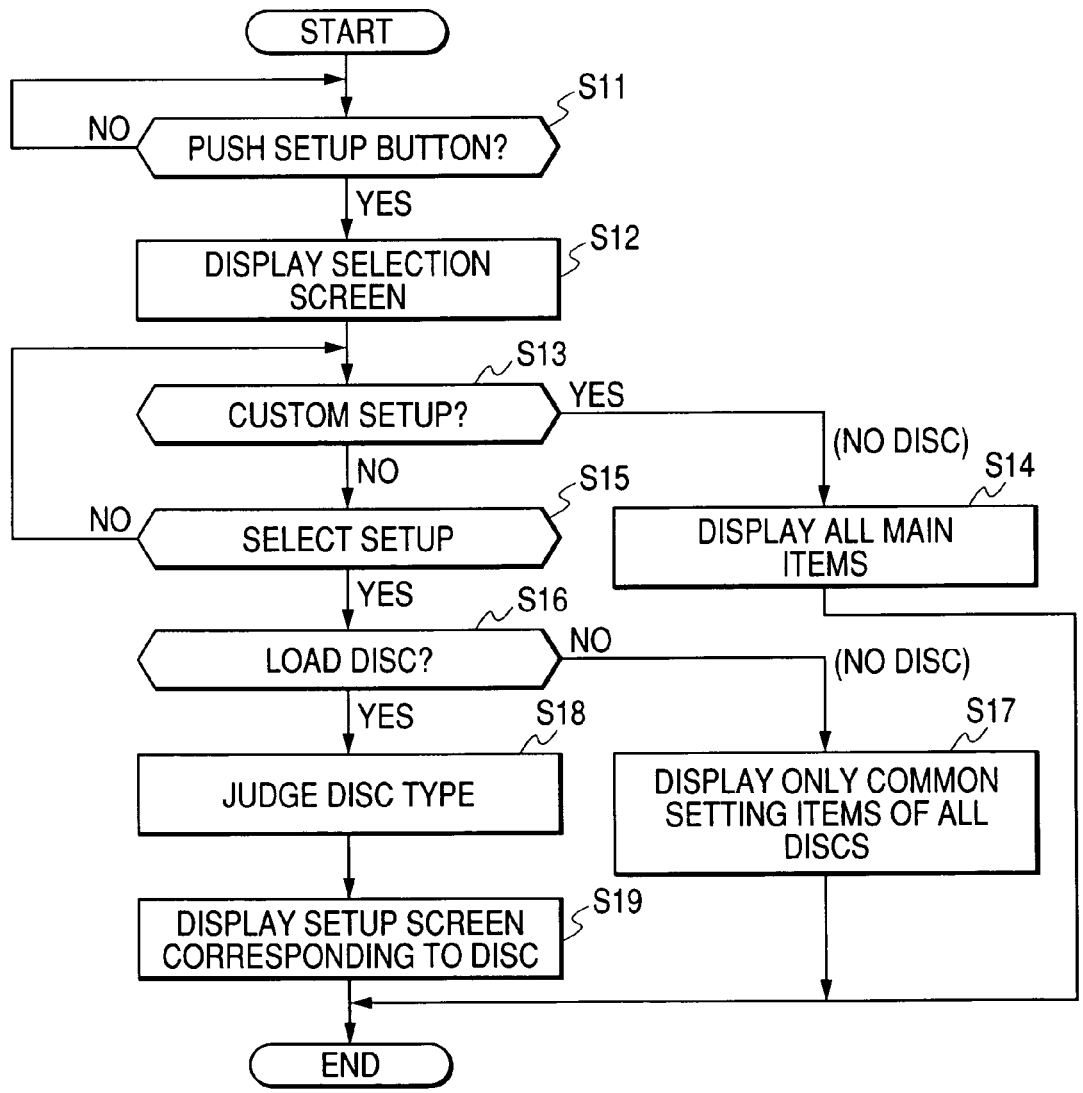
FIG. 9 is a flow chart which corresponded to an embodiment 3, for explaining a display processing operation of a setup screen at the time of a setup mode (basic setup mode) for carrying out a basic setup of an apparatus itself.
Figure 10:
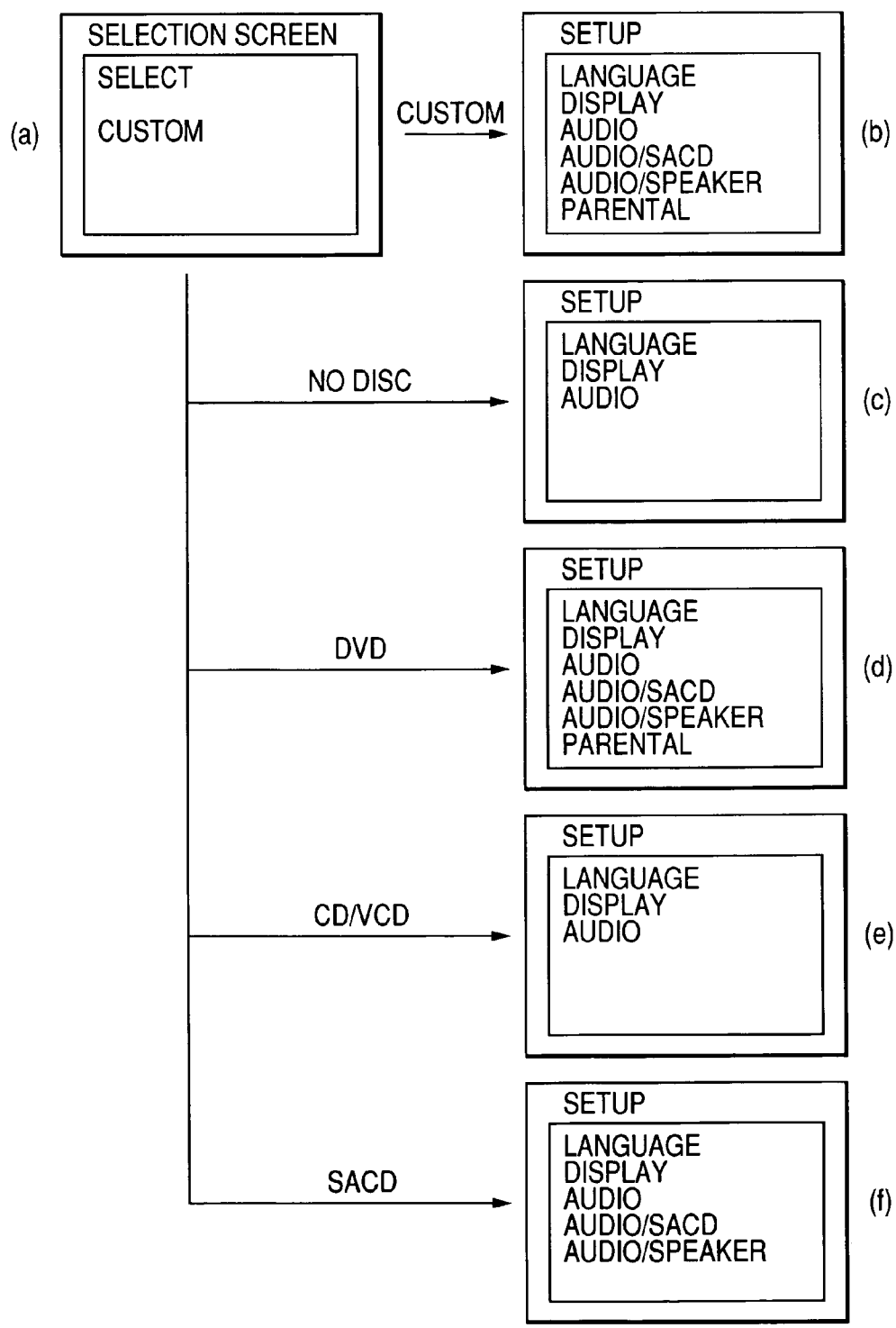
FIG. 10 is an explanation view of a setup which is displayed on a display part in accordance with a user's selection and an information medium.
Figure 11:
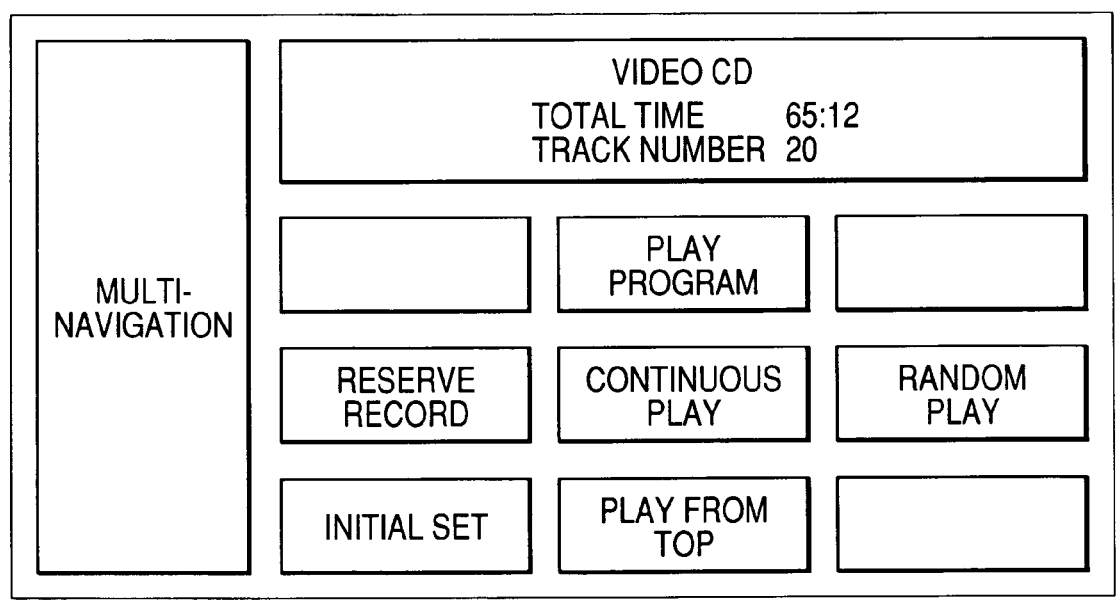
FIG. 11 is an explanation view which shows a list display screen example in which functions, which can be realized in accordance with a type of a disc, were displayed as a list, in a conventional information recording and reproducing apparatus.

This embodiment 3 will be described with reference to a flow chart which is shown in FIG. 9 and a selection screen example which is shown in FIG. 10.

In a stopped state of a reproducing operation, when a user operates the setup button 18a of the remote controller 18 (step S11), this operation signal is received by the light receiving part 14, and given to the system controller 10.

The system controller 10, when it receives this operation signal, firstly confirms whether the disc 1 is loaded on a not-shown tray of the apparatus main body or not (step S12).

Here, in case that a user selected the custom setup from this selection screen (in case that it is judged to be Yes in a step S13), the system controller 10 extracts all main items from the setup item data shown in FIG. 2, which is stored in EEPROM 11, and as shown in FIG. 10(b), displays it on the display part 13 as the setup screen (step S14). That is, the custom setup in this embodiment 3 is the same as the setup screen (see, FIG. 4) in case of NO DISC of the above-described embodiments 1 and 2.

On one hand, in case that a user selected the select setup from the selection screen (in case that it is judged to be No in a step S14, and to be Yes in a step S15), the system controller 10 then confirms whether a disc is loaded on a tray or not (step S16).

As a result of confirmation, in case that the disc is not loaded on the ray (in case that it is judged to be No in a step S16), the system controller 10 extracts only setup items which are common to all discs (DVD, CD, VCD, SACD), from the setup item data shown in FIG. 2, which is stored in EEPROM 11, and as shown in FIG. 10(c), displays them on the setup (step S17). The setup, which is displayed at this time point, is of only main items, and therefore, is of the same display content as the setup shown in FIG. 5.

In this regard, however, a display content of sub items after an arbitrary item is selected from this setup is to be different from the cases of the above-described embodiments 1 and 2. That is, in this embodiment 3, in case that, for example, "LANGUAGE" is selected from the setup shown in FIG. 10(c), sub items which are displayed on a next setup are to be only 2 items of "AUDIO" and "PLAY MENU" which are sub items common to all discs, as apparent from FIG. 2.

Also, as a result of confirmation in the step S16, in case that the disc is loaded on the tray, the system controller 10 judges a type of the disc which is loaded (step S18). And, on the basis of a result of that judgment, the setup, which corresponded to the loaded disc, is displayed (step S19).

For example, only setup items which can be used for the loaded disc are made to be displayed, and setup items which can not be used are not made to be displayed. That is, it made to be non-displayed (see, FIGS. 10(d), (e), (f)). This display form is the same as FIGS. 4 through 6 which were explained in the above-described embodiment 1.

Also, a setup item which can be used for and a setup item which can not be used for the loaded disc are displayed distinctively on the setup, and the setup item which can not be used may be made to fall in the setup impossible state. This display form becomes the same as FIGS. 7 and 8 which were explained in the above-described embodiment 2.

In addition, in a reproduction operating state of the apparatus, when the mode button 18b of the remote controller 18 is operated, in the same manner as in the related art, it is to be able to setup functions with respect to each disc which is loaded.

ADVANTAGE OF THE INVENTION

According to this invention, it is configured in such a manner that, on the occasion of displaying setup items at the time of setup, in case that an information medium is loaded, only a setup item which can be used for the loaded information medium is displayed, and a setup item which can not be used is not displayed. Also, it is configured in such a manner that, on the occasion of displaying setup items at the time of setup, in case that an information medium is loaded, a setup item which can be used for and a setup item which can not be used for the loaded information medium are distinctively displayed on the setup, and the setup item which can not be used is made to fall in a setup impossible state. By this, a user can set up only an item which can be used for a loaded information medium, so that it is possible to improve operability. Also, by setting up only a necessary item with respect to each information medium, it also becomes easily understandable that the items, which are set at the setup, are reflected in case that which type of an information medium is reproduced.

Also, according to this invention, it is configured in such a manner that when the setup button is depressed, there occurs no immediate shift to the setup which corresponded to presence or absence of an information medium and a type of the information medium, but before that, the selection screen for selecting the select setup or the custom setup is displayed on the display part, so that a user can select. By this, a user can firstly select to display all setup items on the setup by selecting the custom select, or to display setup items which corresponded to a status of an information medium by selecting the select setup, and therefore, it is possible to provide setup screens with a variety of display forms to users.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. Information processing apparatus capable of reproducing an information media comprising:
a main body of the information processing apparatus;
a display part;
a set up button setting a basic set up of the information processing apparatus when the information processing apparatus is stopped on a reproducing operation;
a mode button setting up a mode with respect to each information medium loaded, in the reproducing operation of the information processing apparatus;
basic setup control means controlling input of the basic setup of the information processing apparatus by displaying a setup screen on the display part when the setup button is depressed in a stopped state of the information processing apparatus;
information medium detecting means detecting whether or not to load the information medium in the main body of the information processing apparatus; and
type judging means judging a type of the information medium loaded, wherein
the basic setup control means displays all setup items on the setup screen, at the time of a basic setup mode in which the setup button is depressed, in a case that the information medium is not loaded in the main body of the information processing apparatus as a detection result of the information medium detecting means, and
the basic setup control means displays on the setup screen a setup item which can be used for the loaded information medium on the basis of a judgment result of the type judging means, at the time of a basic setup mode in which the setup button is depressed in case that the information medium is loaded in the main body of the information processing apparatus.

2. The information processing apparatus according to claim 1, wherein
the basic setup control means displays on the setup screen only the setup item which can be used for the information medium loaded on the basis of a judgment result of the type judging means, and does not display on the setup screen the set up item which can not be used for the information medium, in case that the information medium is loaded in the main body of the information processing apparatus in a display of the setup item.

3. The information processing apparatus according to claim 1, wherein
the basic setup control means distinctively displays on the setup screen the setup item which can be used for the information medium loaded and the setup item which can not be used for the information medium loaded, on the basis of a judgment result of the type judging means, and makes the setup item which can not be used for the information medium loaded, to fall in a setup impossible state, in case that the information medium is loaded in a display of the setup item.

* * * * *